UNITED STATES PATENT OFFICE.

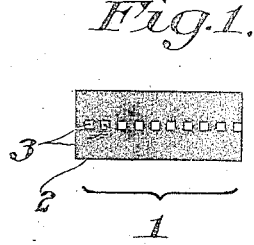
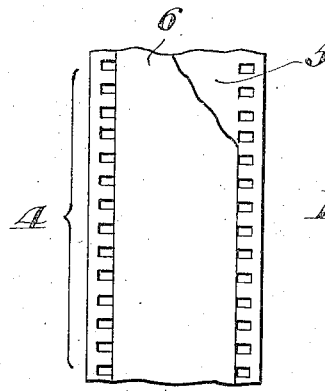
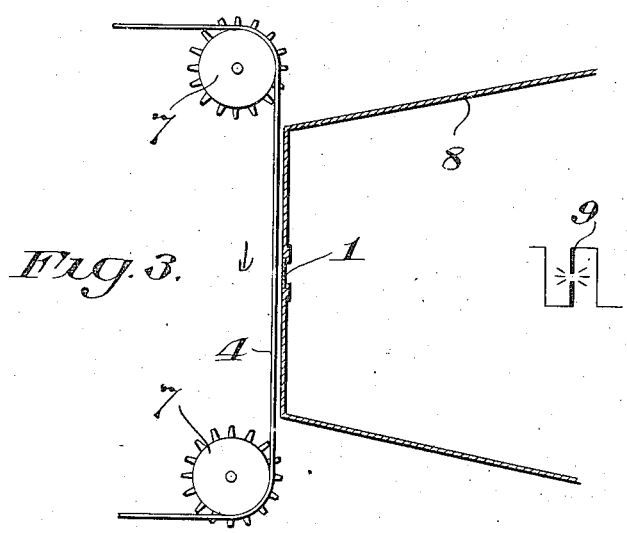
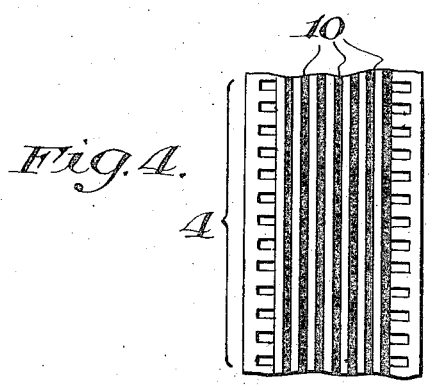

ISIDOR KITSEE, OF PHILADELPHIA, PENNSYLVANIA.

PRODUCING MATRICES AND COLOR-SCREENS THEREFROM.

1,383,819.   Specification of Letters Patent.   Patented July 5, 1921.

Application filed May 6, 1919. Serial No. 295,254.

*To all whom it may concern:*

Be it known that I, ISIDOR KITSEE, a citizen of the United States, residing at Philadelphia, in the county of Philadelphia and State of Pennsylvania, have invented certain new and useful Improvements in Producing Matrices and Color-Screens Therefrom, of which the following is a specification.

My invention relates to an improvement in producing matrices for photographic color screens.

My invention is applicable to the production of color screens integral with blanks for stationary work, which in the nature of the thing are of very restricted dimensions, but my invention also and more specially contemplates the preparation of matrices for moving picture films of desired length. I am aware that today comparatively small plates with integral color screens are produced, but such screens cannot be used for moving picture films for two reasons:—first, on account of their restricted area; second, because the figurations on them are of a dimension too large for the magnification required in moving picture work.

I am also aware that diverse patents in claiming screens for moving picture work, describe means of tinting one or the other part with different colors, but none of them describes or shows means to produce commercially the fine figurations on films of required length and the best authorities of today assert, that with the present means it is impossible to produce color screens integral with moving picture films of required minute characteristics.

In producing color screens for photography, as is well known to persons versed in the art, the fundamental necessity is, that the gelatin or like colloidal film, the substratum in fact carried by the celluloid should be changed in such a manner, that predetermined parts acquire a selective color affinity. In moving picture work the great necessity is also present that the figurations should be of dimensions more minute than of the screens of still pictures of today.

When it is considered that every square inch of such film requires (assuming figurations of one one-thousandth of an inch) the formation of about one million of such figurations and when it is considered that the average moving picture reel contains about twelve thousand square inches requiring therefore about twelve billion figurations, the magnitude of the proposition to produce a selectively colored gelatin film for moving picture work and the impossibility of producing such films of required lengths with these figurations, by present day methods can easily be understood.

For the purpose of my invention, it is only necessary to produce by mechanical or manual means one line of such small figurations, and to suggest to persons versed in the art, ready means to produce this one line I would advise the following procedure:—On a strip of the paper known in commerce as pin-point or cross-section paper of the desired dimensions, every part is covered with an opaque material such as india ink, with the exception of every alternate square of one line, so that in reality we have an opaque design with only one line of transparent or translucent squares, each transparent square followed by an opaque square, and with the aid of well known means, these squares can easily be photographically reduced to the required minute size of one one-thousandth of an inch or even less. If the paper is not sufficiently transparent or translucent the same may be treated with oil. I will now refer to the accompanying drawing and in so doing will describe the method of procedure. But before doing so it is necessary for me to state, that figurations in these drawings are of greater dimensions than in practice, also that the sources of light may differ, and where necessity requires different parts of the device should during the time of exposure be in contact with each other.

With this my invention, films as now usually produced, of a width of from twenty to twenty-five inches may be employed to produce the matrix and then, films of the same width be printed therefrom, but I will here show my invention as applied to standard individual films.

In the drawing Figure 1 is a front view of what I call, the templet and it is supposed that this templet is of a length sufficient to cover the width of the film and it is supposed that the transparent figurations, here squares are of the required dimensions, say one one-thousandth of an inch, and that the opaque space between each of the transparent squares and the square adjoining is of exactly the same dimension as the transparent square itself. Fig. 2 is a plan view of part of a moving picture film provided with a sensitive emulsion. Fig. 3 is a diagrammatic view partially in section illustrating the method of photographing through the templet on the sensitized film. Fig. 4 is a plan view of the film after having gone through the photographic and developing processes.

In Fig. 1, 1 is the templet as an entirety of which 2 are the opaque and 3 the transparent parts. In Fig. 2, 4 indicates the film as an entirety, 5 the celluloid support and 6 the sensitized emulsion. In Fig 3, 4 indicates the film to be exposed, 7, 7 the means to move the film, 8 represents the dark chamber, 9 the source of light, which is here shown as an arc, but other sources of light can be substituted; 1 represents the templet. The film is supposed to travel in the direction of the arrow. In Fig. 4, 4 indicates as in former figures the film as an entirety and 10 the black lines produced by the photographic action of the light passing through the transparent spaces onto the sensitized emulsion. These lines, showing as usual black after being developed correspond in reality in fineness to the transparent sections of the templet.

Films for moving picture work are usually made of about two hundred feet in length and it is therefore suggested that the matrix-film should also be of the same length.

To prepare with the aid of this matrix, moving picture films adapted to be tinted or colored with two colors I proceed as follows:—Two solutions are prepared, one solution containing a suitable dye dissolved in water, the other solution containing sodium bichromate or potassium bichromate also dissolved in water. Both solutions are then intermixed. A solution containing two thirds of a gram of the bichromate to twenty-eight c. c. of water gave good results.

It is now supposed that the colors red and green are selected to produce the color screen proper. The bichromate solution should therefore contain either the red or the green dye.

It is supposed that the green dye is selected as the basic color. The film with its gelatin covering is immersed in this solution and left there for about 6 to 10 minutes. After this operation the film is dried and then subjected to sources of light with the inter-position of the matrix. It is well understood that the gelatin on those places which were exposed to the rays of light will harden and will become insoluble in cold water, whereas those places screened from the action of light by the dark lines will remain in their normal condition and will swell up when immersed in cold or tepid water. After due printing, the film is immersed in water of about normal temperature or a few degrees higher, and after a few minutes' immersion, the formerly protected parts will swell up and will discharge their color. This operation requires not more than from five to ten minutes. The film, when taken out represents then a series of depressed lines, here colored green, each line inter-spaced by a raised line, free from all coloration. To produce the second color, here red, on the raised lines different methods may be employed, one of these methods is:— To simply roll on the second color with the aid of a suitable printing roller. This method can easily be carried out, as the inking-in roller will only come in contact—if pressure is equally distributed and not too great— ith the raised lines, coloring the same, but will leave the depressed lines undisturbed.

As the main purpose of this my invention is to produce matrices with the aid of which moving picture films can, on a commercial scale and with little expense be prepared for the later processes of coloring, it is unnecessary for me to describe here more in detail the required properties of dyes, to be useful for screen purposes.

I have in this specification only described and illustrated the method and means for producing lines of required fineness, and it is supposed that each line of one color succeeded by a line of a second color is not more than one one-thousandth of an inch in width and each square of the templet should therefore not be more than a one-millionth part of a square inch.

Having now described my invention, what I claim as new and desire to secure by Letters Patent is:—

1. The method of producing a color screen integral with moving picture film which consists in first producing a matrix with the required fine lines with the aid of a one row templet, printing therefrom on a bichromate sensitized substratum, raising the protected parts and coloring then selectively the substratum with at least two colors.

2. The method of producing a color screen integral with moving picture film which consists in first producing a matrix comprising lines of required minute width on a properly sensitized film of desired length, exposing then a properly colored and bichromated substratum with the interposition of said matrix to rays of light, raising and clearing from color the protected parts and tinting then the raised parts.

3. In the method of producing color screens integral with moving picture films the steps which consist in producing a templet comprising only one row of minute figurations, carrying a properly sensitized film in juxta-position or contact with said templet and causing light rays to impinge on the moving film through the transparent interstices of said templet.

4. In the production of color screens for moving picture films the steps which consist in producing a templet comprising only one row of minute figurations, carrying a properly sensitized film in juxta-position or contact with said templet, causing light rays to impinge on the moving film through the transparent interstices of said templet, developing and washing said film, sensitizing with a proper bichromate and coloring a second film and photographically printing by contact from said first film on said second film, whereby those parts of the second film screened from the rays of light will remain unchanged and in their former condition and will readily discharge their color, discharging then the color from these unchanged parts and then coloring these parts with a second color.

5. In the art of producing color screens integral with moving picture films the steps as follows, producing a one row templet of minute figurations, producing photographically a matrix from said templet of a greater length than the templet itself, printing with the aid of said matrix on a film sensitized with a proper bichromate and tinted with one color, clearing the color from the parts not affected by the light rays during printing, and tinting the cleared parts with a second color.

In testimony whereof I affix my signature.

ISIDOR KITSEE.